United States Patent [19]
Deguchi et al.

[11] Patent Number: 6,083,354
[45] Date of Patent: *Jul. 4, 2000

[54] TREATMENT METHOD FOR DIAMONDS

[75] Inventors: Masahiro Deguchi, Hirakata; Makoto Kitabatake, Nara; Takashi Hirao, Moriguchi, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/517,460

[22] Filed: Aug. 21, 1995

Related U.S. Application Data

[63] Continuation of application No. 08/095,833, Jul. 22, 1993, abandoned.

[30] Foreign Application Priority Data

Jul. 24, 1992 [JP] Japan .................................. 4-198590
Jul. 24, 1992 [JP] Japan .................................. 4-198591
Jul. 30, 1992 [JP] Japan .................................. 4-202839
Nov. 12, 1992 [JP] Japan .................................. 4-302126

[51] Int. Cl.$^7$ .............................. C07C 1/00; C07C 2/00; C07C 4/00; C07C 5/00

[52] U.S. Cl. .............................. 204/157.15; 204/157.47; 423/446; 427/523; 427/553; 427/554; 427/558; 427/559

[58] Field of Search ..................... 427/523, 553, 427/554, 558, 559; 204/157.15, 157.47; 423/446

[56] References Cited

U.S. PATENT DOCUMENTS

| | | | |
|---|---|---|---|
| 2,945,793 | 7/1960 | Dugdale | 204/157.47 |
| 2,998,365 | 8/1961 | Custers | 204/157.47 |
| 4,012,300 | 3/1977 | Caveney | 204/157.47 |
| 4,849,199 | 7/1989 | Pinneo | 423/446 |
| 4,882,138 | 11/1989 | Pinneo | 423/446 |
| 5,221,411 | 6/1993 | Narayan | 156/603 |
| 5,234,724 | 8/1993 | Schmidt | 427/530 |
| 5,677,372 | 10/1997 | Yamamoto et al. | 524/495 |

FOREIGN PATENT DOCUMENTS

| | | |
|---|---|---|
| 2212297 | 9/1987 | Japan . |
| 1-246116 | of 1989 | Japan . |
| 171653A | 3/1989 | Japan . |
| 62-226076 | 3/1989 | Japan . |
| 1263277 | 10/1989 | Japan . |
| 04219400 | 8/1992 | Japan . |

*Primary Examiner*—Dwayne C. Jones
*Assistant Examiner*—C. Delacroix-Muirheid
*Attorney, Agent, or Firm*—McDermott, Will & Emery

[57] ABSTRACT

The object of the present invention is to provide a treatment method to remove lattice defects and non-diamond elements that exist in a diamond or a diamond thin film.

The treatment method whereby the aforementioned object is achieved is to have the diamond or the diamond thin film irradiated by ultra-violet light or heated in an oxygen ambient.

According to said treatment method, it has become possible to obtain a diamond or a diamond thin film that is free from the adverse effects of lattice defects and non-diamond elements.

18 Claims, 5 Drawing Sheets

TREATMENT METHOD FOR DIAMONDS

This is a continuation application of application Ser. No. 08/095,833 filed Jul. 22, 1993, now abandoned.

BACKGROUND OF THE INVENTION

The present invention relates to a treatment method for diamonds to improve the crystallinity of diamonds used as semiconductors and insulating materials in the electronics industry.

Diamonds have attracted interest recently as semiconductors and insulating materials in the electronics industry due to many excellent properties thereof. However, artificial diamonds generally tend to contain lattice defects and non-diamond components such as graphite and the like.

For instance, in the case of a diamond thin film deposited on a substrate material by the CVD (Chemical Vapor Deposition) method, the diamond is under a metastable state in an ambient (i.e., an environment or atmosphere) wherein the CVD is performed, and graphite and other non-crystalline carbon components having more stability get sometimes into the diamond thin film. Also, when ions of such elements as boron and the like are irradiated on a diamond to make it electro-conductive, it is known that lattice defects and non-diamond components will be created due to the ion implantation in the region where the ions are implanted.

These lattice defects and non-diamond components cause the excellent features of the diamond in the electrical characteristics such as insulating resistivity, carrier mobility and the like, and also in the mechanical characteristics, for example, to deteriorate greatly.

In order to make the most of the inherent features of the diamond, it is necessary to restore the intrinsic diamond structure in the region suffering from the lattice defects and non-diamond components or to remove the causes that have resulted in deterioration of the features of the diamond.

As explained in the foregoing, it is necessary to apply a treatment to diamonds for elimination of the adverse effects as enumerated above in order to use the diamond widely in the industry.

The measures so far employed for the above purpose only find a method of thermal annealing, a method of chemical etching wherein immersing in a mixed solution of nitric acid and sulfuric acid takes place or an etching method performed through an exposure to argon plasma.

The aforementioned thermal annealing method is to try to recover the crystal lattice by supplying energy through heating a specimen as often practiced with silicon. However, in the case of diamonds, heat application tends to produce graphite and the treatment method by annealing can not possibly contribute to elimination of the lattice defects very much.

The etching in a mixed solution of nitric acid and sulfuric acid can remove the non-diamond components existing on the surface, but it is difficult to remove the lattice defects and the non-diamond components contained within the crystal. Besides, the substrate materials that can be treated according to this method are limited in variety.

Furthermore, the etching treatment by plasma has shown a problem of inflicting additional damages on account of a bombardment of the high energy ions and electrons contained in the plasma.

Thus, the treatment methods that have been so far practiced are not good enough and a new treatment method for diamonds has been much sought after.

SUMMARY OF THE INVENTION

The present invention aims at solving the problems associated with the conventional treatment methods for diamonds, and providing a method to make it possible to remove lattice defects and non-diamond components contained in diamonds by irradiating ultra-violet light on diamonds or diamond thin films, and also by heating in an oxygen ambient.

In order to achieve the foregoing object, a first treatment method for diamonds disclosed by the present invention is to have light in the ultra-violet spectrum irradiated on a diamond or a diamond thin film deposited on a specified substrate.

According to this treatment method for diamonds, it is desirable that the power density of the irradiation light in the ultra-violet spectrum is at least 0.1 $W/cm^2$, the irradiated light in the ultra-violet spectrum is excimer laser, the ambient wherein the light in the ultra-violet spectrum is irradiated contains at least hydrogen, and the ambient wherein the light in the ultra-violet spectrum is irradiated contains at least oxygen.

A second treatment method for diamonds as disclosed by the present invention comprises the step of heating a diamond or a diamond thin film deposited on a specified substrate in an ambient containing at least oxygen.

According to this treatment method for diamonds, it is desirable that the heating temperature range is from 300 to 700° C., and the oxygen ambient is air.

A third treatment method for diamonds as disclosed by the present invention comprises the step of irradiating light in the ultra-violet spectrum on a diamond or a diamond thin film deposited on a specified substrate after a bombardment of accelerated particles.

A fourth treatment method for diamonds as disclosed by the present invention comprises the steps of irradiating light in the ultra-violet spectrum on a diamond or a diamond thin film deposited on a specified substrate after a bombardment of accelerated particles, and further heating in an ambient containing at least oxygen.

A fifth treatment method for diamonds as disclosed by the present invention comprises the step of irradiating light in the ultra-violet spectrum on a diamond or a diamond thin film deposited on a specified substrate while accelerated particles are bombarded thereon.

A sixth treatment method for diamonds as disclosed by the present invention comprises the step of heating a diamond or a diamond thin film deposited on a specified substrate in an ambient containing at least oxygen after irradiating light in the ultra-violet spectrum thereon while accelerated particles are bombarded.

In the third through sixth treatment methods for diamonds as disclosed by the present invention, it is desirable that the bombarded particles include at least one element of the III group elements such as boron (B), aluminum (Al), gallium (Ga), indium (In) and the like, and the V group elements such as nitrogen (N), phosphor (P), arsenic (As), antimony (Sb) and the like.

Also, in the third through sixth treatment methods for diamonds disclosed by the present invention, it is desirable that the bombarded particles are ions, the power density of the irradiated light in the ultra-violet spectrum is at least 0.1 $W/cm^2$, and the irradiated light in the ultra-violet spectrum is excimer laser light.

Further, in the fourth or sixth treatment method for diamonds as disclosed by the present invention, it is desirable that the heating temperature range is from 300 to 700° C., and the ambient containing at least oxygen is air.

According to the foregoing treatment methods, it has become possible to remove the lattice defects and the non-diamond components contained in diamonds and to obtain a diamond and a diamond thin film of an excellent performance.

Figure 1:
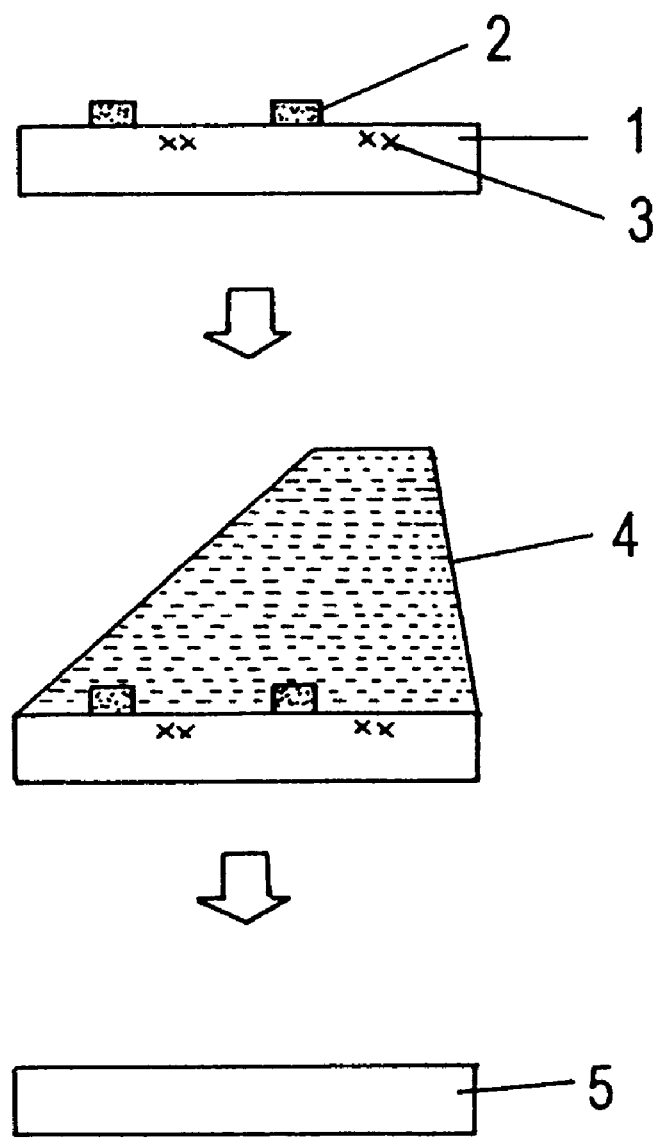
FIG. 1 shows schematic diagrams for a series of the steps of ultra-violet light irradiation performed according to the treatment method for diamonds as disclosed by the present invention.

Key to Symbol
1 Diamond
2 Non-diamond components
3 Lattice defects
4 Ultra-violet light
5 Diamond after treatment
6 Diamond
7 Particles containing impurity elements
8 Implantated region
9 Ultra-violet light
10 Restored diamond layer

DESCRIPTION OF THE PREFERRED EMBODIMENTS

The present invention will be explained in the following with the help of drawings:

To begin with, a first treatment method for diamonds of the present invention will be described.

The first treatment method for diamonds as disclosed by the present invention is to irradiate light in the ultra-violet spectrum on a diamond or a diamond thin film deposited on a specified substrate.

Schematic diagrams as shown in FIG. 1 illustrate how the treatment of a diamond or a diamond thin film deposited on a specified substrate is performed by irradiating light in the ultra-violet spectrum.

The diamond to be irradiated by the ultra-violet light can be either in a lump form or in a thin film formed on a specified substrate by the vapor deposition method. The said diamond 1 has non-diamond components 2 on the surface thereof and contains lattice defects 3 therein. The ultra-violet light 4 is irradiated on said diamond 1. The ultra-violet light 4 irradiated can be any light as long as the spectrum thereof falls in the ultra-violet range. Because of good availability, it is desirable to use such light sources having a wave length range of 180 to 400 nm as a deuterium lamp, nitrogen laser, excimer laser and the like.

The mode of the light irradiated can be either continuous or pulsated. For elevating the power density of the irradiated ultra-violet light, a focusing lens is also used. In case wherein the radiation of the ultra-violet light can not be extended over the entire surface of the diamond due to the exceedingly large area thereof, the diamond 1 can be moved, instead, for a uniform exposure of the surface to the light, or a method, whereby the surface of the diamond is scanned by the ultra-violet light 4, can be used. Among the light sources enumerated above, the excimer laser (wave length: 308 nm, 248 nm, 179 nm, etc.) is often used from the consideration of both the wave length and the irradiation power.

After irradiation of the ultra-violet light according to one of the methods described above, it was observed that the non-diamond components 2 and the lattice defects 3 had been removed from the treated diamond 5 and also the lattice structure had been restored.

The ultra-violet light irradiation according to the foregoing steps of the treatment method was performed either in vacuum or in an ambient containing oxygen or hydrogen. When the irradiation is carried out in vacuum, it is desirable to maintain the atmospheric pressure at $1\times10^{-5}$ Torr. or less.

When the irradiation is carried out in an ambient containing oxygen or hydrogen, it is desirable to maintain the partial pressure at $1\times10^{-6}$ to $1\times10^{9}$ Torr. This treatment method will be described in concrete details later in a first exemplary embodiment (Example 1) and a second exemplary embodiment (Example 2) of the present invention.

Next, a second treatment method for diamonds of the present invention will be described.

The second treatment method disclosed by the present invention is to heat a diamond or a diamond thin film formed on a specified substrate in an ambient containing at least oxygen.

In this case also, the diamond to be subjected to this treatment can be either in a lump form or in a thin film formed on a substrate material by the vapor deposition method.

The method of heating the diamond can not necessarily be a specific one. An electric furnace or an infrared heating furnace generally used as a method of heating is often used.

Further, the atmospheric pressure of the ambient, wherein the diamond is subjected to the heating treatment, is not limited to any specific pressure, but can be the pressure of air. Oxygen gas or air is just introduced into the furnace to form the ambient of the diamond to be subjected the treatment in the furnace.

In deciding the period of the treatment, both the partial pressure of oxygen in the ambient and the heating temperature have to be considered, but a treatment period of 1 to 30 minutes is often used.

A further detailed description of the foregoing treatment method will be given later in a third exemplary embodiment (Example 3) and in a fourth exemplary embodiment (Example 4) of the present invention.

Now, an explanation on a third treatment method and a fourth treatment method for diamonds will be given in the following:

The third treatment method disclosed by the present invention is to irradiate light in the ultra-violet spectrum on a diamond or a diamond thin film deposited on a specified substrate after a bombardment of accelerated particles on the diamond or on the diamond thin film.

The fourth treatment method disclosed by the present invention is to heat diamond in an ambient containing at least oxygen after the diamond has been through with the third treatment method.

Figure 2:
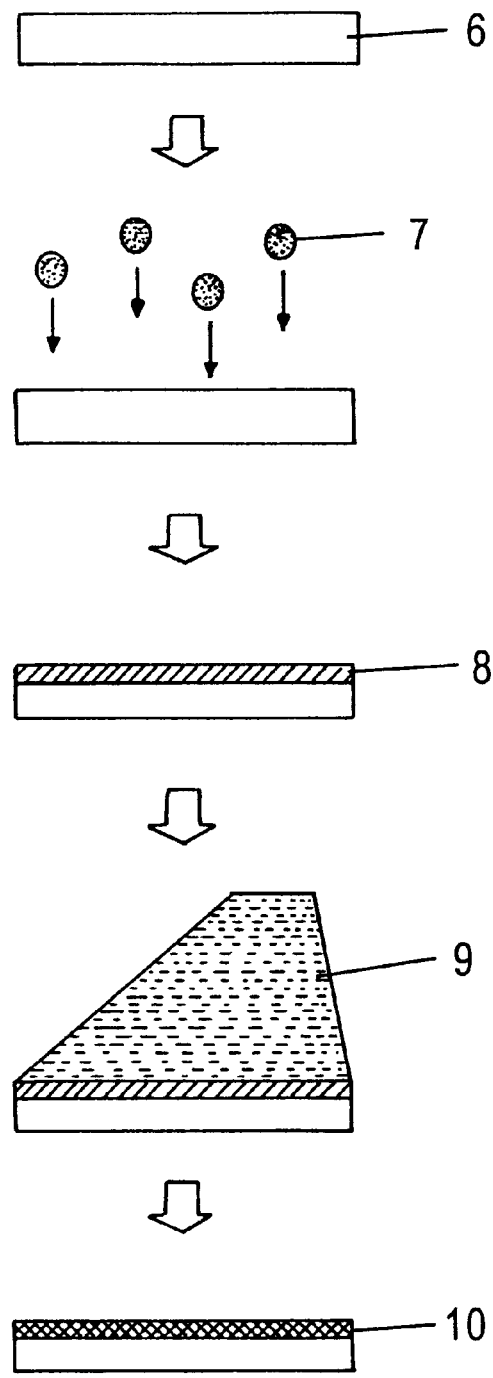
FIG. 2 shows conceptual diagrams for a series of the steps of a bombardment of impurity particles and ultra-violet light irradiation performed according to the treatment method for diamonds as disclosed by the present invention.

FIG. 2 shows the steps whereby the third treatment method is put into practice.

First, accelerated particles 7 containing impurity elements are bombarded on a diamond 6 serving as a substrate material.

The acceleration energy and the bombardment amount of the particles are not specifically limited, but it is desirable to use the ranges of 50 to 200 keV and $5\times10^{14}$ to $5\times10^{15}$ particles/cm$^2$, respectively.

As a result, on the surface of the diamond 6 is formed a region 8 implanted with the particles 7 containing the impurity elements. However, some defects are contained in the implanted region 8 due to the adverse effects of the bombardment of the particles.

Subsequently, in order to remove the aforementioned defects and also activate the implanted impurity elements, ultra-violet light 9 is irradiated on the diamond.

The light source and the mode of said ultra-violet light are the same as described before.

As a result, the defects of the region 8 implanted with the impurity elements have been removed and the impurity particles introduced at the same time have been settled in the lattice points of the diamond structure to create a diamond layer 10.

In addition, as observed with the fourth treatment method, the step of heating in an ambient containing at least oxygen will further enhance the effectiveness of the foregoing process.

Details of this treatment method will be described later in a fifth exemplary embodiment (Example 5) of the present invention.

Lastly, a fifth treatment method and a sixth treatment method for diamonds will be explained.

The fifth treatment method for diamonds is to irradiate light in the ultra-violet spectrum on a diamond or a diamond thin film formed on a substrate material while accelerated particles are bombarded.

The sixth treatment method for diamonds is to have a step of heating in an ambient containing at least oxygen in addition to the fifth treatment method for diamonds.

Figure 3:
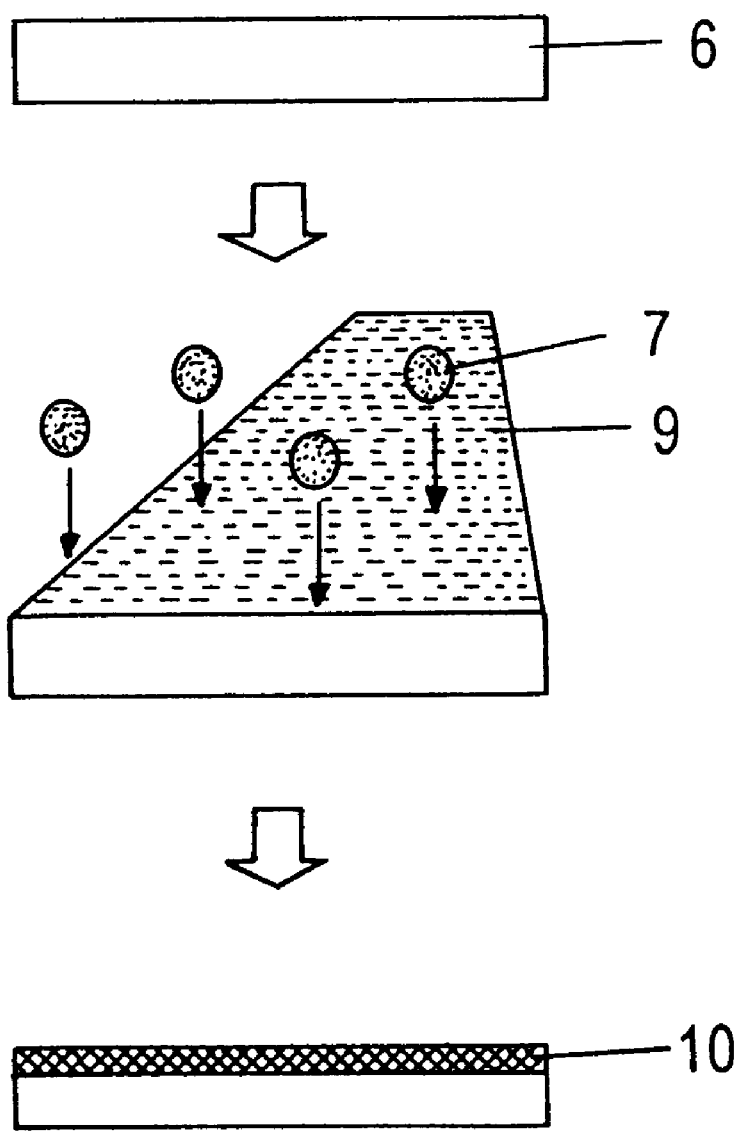
FIG. 3 shows conceptual diagrams for another series of the steps of a bombardment of impurity particles and ultra-violet light irradiation performed according to the treatment method for diamonds as disclosed by the present invention.

FIG. 3 shows the steps of the fifth treatment method for diamonds.

The numerical symbols as used in FIG. 3 are the same as the ones used in FIG. 2, and a further explanation thereof will not be made here.

Details of this treatment method for diamonds will be described later in a sixth exemplary embodiment (Example 6) of the present invention.

Now, the foregoing treatment methods for diamonds will be explained in concrete details by exemplary embodiments of the present invention.

EXAMPLE 1

As the diamond 1, a diamond thin film deposited on a silicon substrate to a thickness of 2 um by the microwave plasma CVD method was used, and according to the steps indicated in FIG. 1, ultra-violet light was irradiated on the diamond 1. The diamond thin film was in a poly-crystalline state before application of this treatment and the result of a Raman spectroscopic analysis of the diamond thin film showed signals indicating the existence of non-crystalline carbon components as observed in FIG. 4.

A container wherein the diamond thin film had been placed was evacuated by means of a vacuum pump to show an atmospheric pressure of $1\times10^{-6}$ Torr. or below.

As the ultra-violet light 4, an excimer laser light of 248 nm in wave length was used and irradiated in a pulse mode through an ultra-violet light transmitting glass on the diamond thin film.

The laser light output had energy of 400 to 500 mJ per pulse and a frequency cycle of 10 Hz. One hundred pulses of the laser light were irradiated on the diamond thin film and the irradiation power density was 1 W/cm$^2$ in average.

Figure 5:
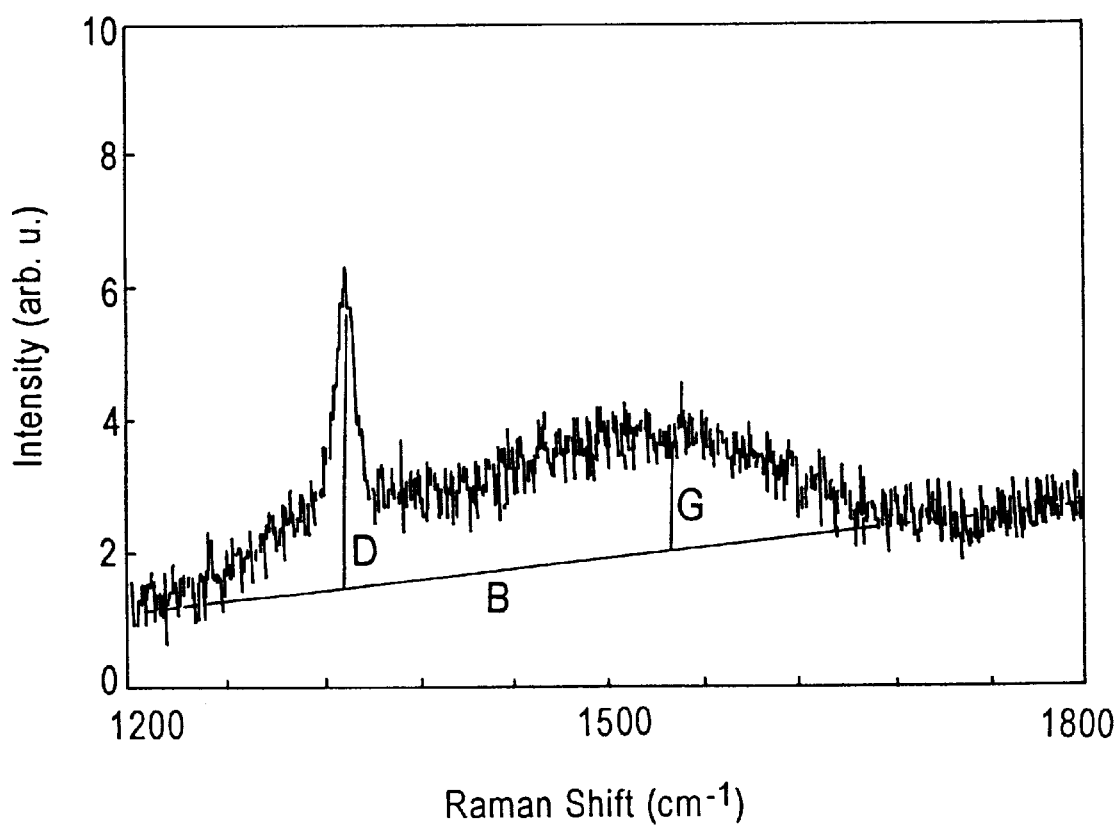
FIG. 5 shows a Raman spectrum diagram of a diamond thin film formed by the vapor deposition method after performing a treatment by ultra-violet light irradiation.

As a result, it was confirmed by a Raman spectroscopic analysis as shown in FIG. 5 that most of the non-crystalline carbon components assumed to have existed in the grain boundary of the poly-crystalline diamond were removed.

Figure 4:
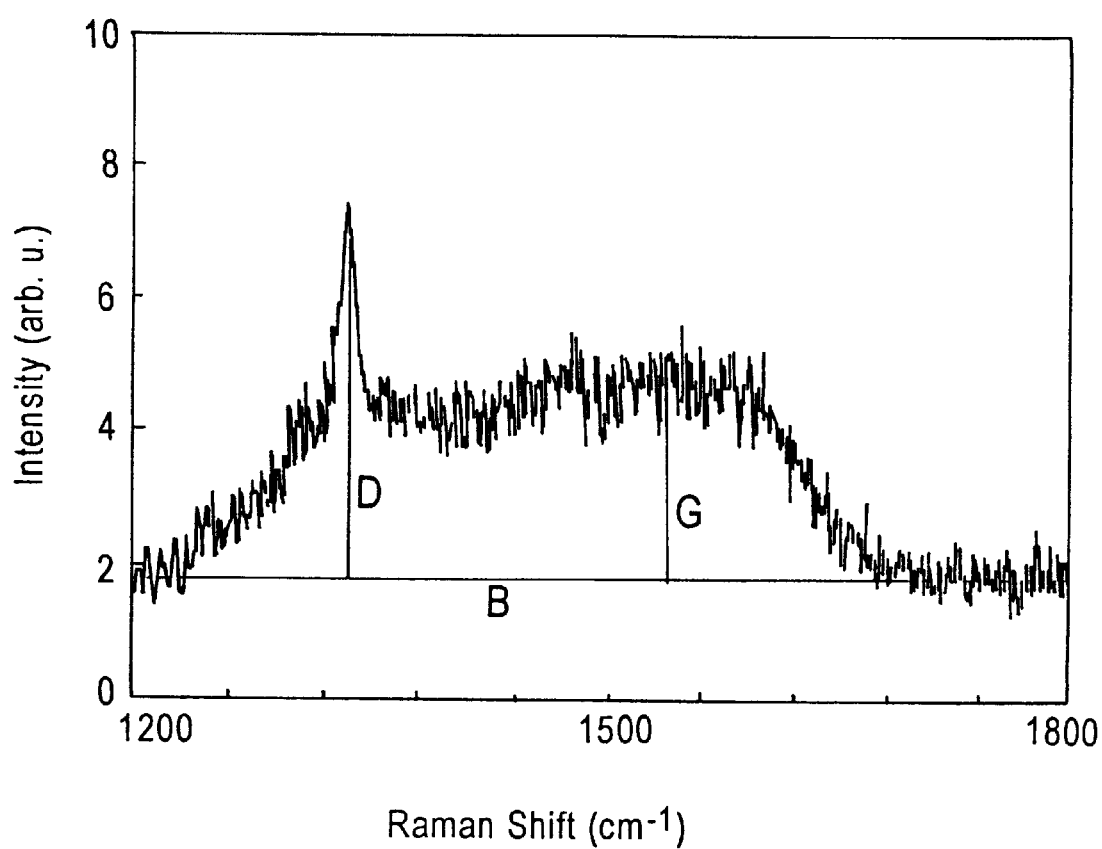
FIG. 4 shows a Raman spectrum diagram of a diamond thin film formed by the vapor deposition method before performing by a treatment by ultra-violet light irradiation.

In other words, when the diamond component with the background component (referred to as B in FIG. 4 and FIG. 5) subtracted therefrom (indicated by line D) and the non-diamond component with the background component subtracted therefrom are studied on the Raman spectroscopic analyses shown in FIG. 4 and FIG. 5, the length of the line D (diamond component) does not seem to have changed between before the treatment by the ultra-violet light irradiation as shown in FIG. 4 and after the treatment by the ultra-violet light irradiation as shown in FIG. 5, but the length of the line G (graphite component) has decreased markedly after the treatment by the ultra-violet light irradiation as shown in FIG. 5.

The results of the foregoing analyses indicate that only the graphite component is reduced while the diamond component is kept unchanged.

Besides, even when light from a deuterium lamp was focused through a lens and irradiated as the ultra-violet light, the same results as above were obtained.

Although the irradiation power density of the ultra-violet light as used in the present exemplary embodiment was 1 W/cm$^2$, it was confirmed that the irradiation power density ranging from as low as 0.1 W/cm$^2$ inclusive to 1 W/cm$^2$ was equally effective.

EXAMPLE 2

The same method and sample as used in Example 1 were employed and the ultra-violet light irradiation was performed in an ambient containing oxygen of $1\times10^{-4}$ Torr. in partial pressure.

The irradiation condition of an excimer laser light with a wave length of 248 nm was 200 to 300 mJ as the energy per pulse and 0.5 to 0.8 W/cm$^2$ as the average irradiation power, which was lower than that used in Example 1.

The same result in terms of effectiveness as Example 1 was obtained although the ultra-violet light irradiation energy was reduced.

This is considered due to enhanced efficiency which was realized by a reaction between the oxygen atoms contained in the ambient and the carbon atoms of the non-diamond components activated by the energy supplied from the ultra-violet light, e.g. by a mechanism similar to evaporation of carbon monoxide gas.

Also, it was confirmed that generation of hydrocarbon caused by the ultra-violet light irradiation in an ambient containing hydrogen contributes to enhancing the effect to remove the non-diamond components.

EXAMPLE 3

A diamond thin film deposited on a quartz substrate by the CVD method was heated in an ambient containing oxygen. The diamond thin film was deposited by the generally used microwave plasma CVD method.

The obtained film was poly-crystalline, but any signals indicating the presence of non-carbon components were hardly observed upon the Raman spectroscopic analysis of the sample.

In spite of the above observation, the resistance of the obtained diamond thin film was approximately $1 \times 10^8$ ohms. This value is extremely low when compared with the inherent resistance of diamond and considered due to the electro-conduction caused by either a very small amount of the non-diamond components intermixed or the hydrogen atoms absorbed on the surface of the diamond thin film.

Then, said sample was placed in air (the oxygen content ratio: about 20%) and heated to 600° C. in an electric furnace. After said sample was allowed to stand for 10 minutes, it was cooled in nature in the foregoing ambient.

As a result, the resistance of the film turned out to be in the order of $1 \times 10^{13}$ ohms.

In order to confirm that this effect was due to the existence of oxygen, the same treatment was performed either in vacuum (atmospheric pressure: about $3 \times 10^{-7}$ Torr.) or in a nitrogen ambient.

The result was that a small change in the resistance was observed but any substantial increase in the resistance was hardly recognized.

Accordingly, only when the sample was heated in an ambient containing oxygen, an increase in resistance due to removal of non-diamond components was observed.

At the same time, it was confirmed that insulation strength and electro-conductivity of the diamond thin films were improved.

It was also confirmed that the same effect as above was gained even when the oxygen content ratio of air was varied. In connection with the heating temperature, the temperature ranging from 600 to 700° C. was most effective for the treatment period of 10 minutes, but it was confirmed that the same effect as above could be gained by a longer treatment period even at a relatively low treatment temperature (300 to 400° C.).

EXAMPLE 4

An artificial single crystal diamond produced by a high-pressure synthesizing method was processed by the treatment method of the present invention.

First, for removal of impurities such as metal and the like attached to the diamond plate produced by the high-pressure synthesizing method, the sample diamond plate was immersed in hydrogen fluoride.nitric acid solution and then washed in pure water.

After the foregoing step, the impurities considered to have been attached to the surface of the diamond were removed. However, the resistance of the diamond surface was around $1 \times 10^8$ ohms, which was indicative of existence of an electro-conductive layer on the diamond surface. Then, said sample was heated for 10 minutes at 600° C. in an oxygen ambient according to the treatment method as disclosed by the present invention.

As a result, the resistance was increased to $1 \times 10^{13}$ ohms and more, showing the insulation strength inherent to diamond.

EXAMPLE 5

According to the steps shown in FIG. 2, particles and ultra-violet light were bombarded and irradiated, respectively, on a diamond thin film deposited as the diamond 6 to a thickness of 5 um on a silicon substrate by the microwave plasma CVD method.

First, a container, wherein the diamond 6 was placed, was evacuated by means of a vacuum Pump sufficiently enough to reduce the atmospheric pressure in the container to $1 \times 10^{-6}$ Torr. and less.

Then, boron ions ($B^+$) gained as the particles 7 containing impurities from an ion source were accelerated to 100 keV and bombarded on the diamond 6 with a dose of $1 \times 10^{15}$ ions/cm$^2$.

As a result, boron atoms were implanted in a region 0.3 um deep from the surface of the diamond thin film deposited on the substrate material.

However, there existed defects in the implanted region 8 and also the boron atoms were not activated in this state. So, excimer laser light of 248 nm in wave length was irradiated in a pulse mode as the ultra-violet light 9.

The laser light had output power of 400 to 500 mJ per pulse and the irradiation was performed 100 times with a 10 Hz cycle period.

The average irradiation power density was 1 W/cm$^2$. Consequently, the defects that had been created in the diamond thin film implanted with the boron ions were removed and a diamond structure was restored.

At the same time, the implanted boron atoms gained entry in the lattice positions of the diamond structure with resulting creation of a diamond layer 10 having p-type electrical characteristics.

The same result was obtained when other ions were used in the foregoing treatment method.

Even when electrically neutral particles were employed in the foregoing treatment method in place of the impurity particles for bombardment on the diamond surface, the same result was obtained.

In addition, it was confirmed that a removal of non-diamond components was achieved more effectively by conducting the heat treatment conducted in an ambient containing at least oxygen.

EXAMPLE 6

When particles are bombarded on a single crystal diamond, the extent of the damage inflicted on the diamond is said to be greater than that on a poly-crystalline diamond thin film.

So, a semiconductor diamond layer was formed according to the steps shown in FIG. 3, which enabled the defects of the diamond 6 formed of a single crystal diamond to be removed one after another as the defects were created by irradiating ultra-violet light on the diamond 6 while particles were bombarded at the same time.

First, in the same way as was in Example 5, a container, wherein a single crystal diamond as the diamond 6 was placed, was evacuated by means of a vacuum pump sufficiently enough to reduce the atmospheric pressure in the container to $1 \times 10^{-6}$ Torr. and less.

Then, boron ions ($B^+$) gained from an ion source were accelerated to 100 keV and bombarded on the diamond 6 and at the same time, excimer laser light of 248 nm in wave length serving as the ultra-violet light 9 was irradiated in a pulse mode.

The energy of the laser light output was 200 to 500 mJ per pulse and the irradiation cycle thereof was 0.5 to 10 Hz.

The dose of the boron particle bombardment was $1 \times 10^{15}$ ions/cm$^2$.

As the result of having the particle bombardment and the ultra-violet light irradiation performed at the same time, no defects were observed in the particle implanted layer even immediately after the implantation and also a diamond layer 10 having p-type electrical characteristics was obtained.

Even when other ions were used in the foregoing treatment method, the same result was obtained.

The same result was also obtained even when electrically neutral particles were employed with the impurity particle bombardment in place of ions.

In addition, it was confirmed that a removal of non-diamond components was achieved more effectively by conducting the heat treatment conducted in an ambient containing at least oxygen.

The effects of the treatment methods for diamonds disclosed by the present invention will be explained in the following:

When light in the ultra-violet spectrum is irradiated on a diamond, the light just passes through the diamond at portions where any defects or non-diamond components do not exist.

However, in regions where defects and non-diamond components exist, the ultra-violet light will be selectively absorbed and on account of the energy of the absorbed ultra-violet light, the disturbed diamond structure will be recovered and etching of the non-diamond components will be taking place. The aforementioned selective absorption occurring only in the regions where non-diamond components exist does not result in graphitizing the diamond unlike the case wherein the whole diamond is heated.

In the foregoing treatment, energy that makes it possible to remove the defects efficiently can be provided by making the power density of the irradiated ultra-violet light equal to 0.1 $W/cm^2$ or more.

Besides, use of excimer laser as the source of the irradiated ultra-violet light can contribute not only to obtaining a high energy density readily but also to facilitating control of the irradiation period and the like.

Further, when the ambient wherein the ultra-violet light irradiation takes place contains either at least hydrogen or at least oxygen, the hydrogen atoms or the oxygen atoms will contribute to etching of the non-diamond components, resulting in facilitating the removal thereof.

Also, by heating the diamond in an ambient containing at least oxygen, the non-diamond components such as graphite and non-crystalline carbon, both being very reactive with oxygen, will evaporate in a form like carbon monooxide and will be removed.

In that occasion, by having the heating temperature ranging from 300 to 700° C., it will be possible to remove the non-diamond components only efficiently without any graphitization of the diamond.

Even when air containing oxygen in an ratio of 20% was used as the ambient wherein heating took place, not speaking of oxygen gas used as the ambient, a good result was also obtained.

As described in the foregoing, it is possible to remove the defects and the non-diamond components that exist in a diamond in a lump form or a diamond thin film by irradiating ultra-violet light or heating in an oxygen ambient. This treatment method can also be utilized even in the case wherein accelerated particles are bombarded on the diamond surface for the purpose of implanting impurity elements into the diamond.

In other words, the lattice defects created in the implanted region at the time of bombardment of the accelerated particles can be removed by the aforementioned effect of ultra-violet light irradiation. In addition, the impurity particles introduced at the same time can settle in the lattice positions.

Furthermore, by heating in an ambient containing at least oxygen, the whole process of the treatment will become more effective.

With both the ultra-violet light irradiation and the bombardment of accelerated particles performed simultaneously, defects of the diamond will be removed in succession before it becomes difficult for the diamond to recover from the defective state, resulting in facilitating the removal of the defects.

In this occasion, too, heating in an ambient containing at least oxygen makes the whole process of the treatment more effective.

Also, the condition required of the particles for bombardment on the diamond is just to contain at least one element of the III group elements such as boron (B), aluminum (Al), gallium (Ga), indium (In) and the like, and the V group elements such as nitrogen (N), phosphor (P), arsenic (As), antimony (Sb) and the like.

As a result, it becomes possible to form a semiconductor diamond layer which has an industrially useful configuration and n-type conduction.

The use of ions as the bombardment particles contributes to facilitating control of the bombardment amount of particles and the intensity of bombardment energy.

According to the present invention, it is possible to provide a method whereby a diamond in a lump form and a diamond thin film are prepared without being adversely affected by the presence of non-diamond elements.

Therefore, it has become possible to utilize such excellent characteristics of diamond as in electrical performance like insulation strength and carrier mobility, thermal conductivity, mechanical Performance and the like to the fullest extent in the diverse applications of diamond.

The effectiveness of the treatment method for diamonds as disclosed by the present invention will be summarized as follows:

According to the present invention, a treatment method for diamonds, whereby it becomes possible to remove readily lattice defects and non-diamond components existing in the diamonds, can be provided.

As set forth as the second invention, a treatment method for diamonds to remove defects efficiently by making the power density of the irradiated ultra-violet light equal to 0.1 $W/cm^2$ or more can be provided.

Also, as set forth as the third invention, a treatment method for diamonds, whereby ultra-violet light of a high energy density obtained from excimer laser can be readily irradiated and also controlling of the irradiation period and the like can be made easily, can be provided.

Further, as set forth as the fourth and fifth inventions, treatment methods for diamonds, whereby a removal of non-diamond elements is made easy through use of an ambient containing at least hydrogen or an ambient containing at least oxygen as the ambient in which ultra-violet light is irradiated on the diamond so as to have the etching of the non-diamond elements promoted by hydrogen or oxygen, can be provided.

As set forth as the sixth invention, a treatment method for diamonds, whereby the non-diamond elements and the like which are very reactive with oxygen can be removed readily through heating the diamond in an ambient containing at least oxygen, can be provided.

Also, as set forth as the seventh invention, a treatment method for diamonds, whereby only the non-diamond components can be efficiently removed through heating at temperatures ranging from 300 to 700° C. yet without causing any graphitization to the diamond, can be provided.

Further, as set forth as the eighth invention, a treatment method for diamonds, wherein the effectiveness thereof can be attained even when heating is performed in air, can be provided.

Lastly, as set forth as the ninth through twelfth inventions, a treatment method for diamonds, which is applicable even when accelerated particles are bombarded on the diamond, can be provided.

What is claimed is:

1. A treatment method for diamonds comprising manufacturing a diamond or a diamond thin film on a specified substrate and subsequently bombarding accelerated particles against the diamond or the diamond thin film and then irradiating light in an ultra-violet spectrum thereon.

2. A treatment method for diamonds comprising bombarding a diamond or a diamond thin film formed on a specific substrate, by accelerated particles and then irradiating by light in an ultra-violet spectrum and further heating in an ambient containing at least oxygen.

3. A treatment method for diamonds comprising manufacturing a diamond or a diamond thin film on a specified substrate and subsequently bombarding the diamond or the diamond thin film by accelerated particles and at the same time irradiating by light in an ultra-violet spectrum.

4. A treatment method for diamonds comprising bombarding a diamond or a diamond thin film formed on a specified substrate by accelerated particles and at the same time irradiating by light in an ultra-violet spectrum, and then heating in an ambient containing at least oxygen.

5. The treatment method for diamonds according to claims 1, 2, 3 or 4, wherein the particles bombarded on the diamond or the diamond thin film formed on a specified substrate, are inclusive of at least one element of the III group elements, and the V group elements.

6. The treatment method according to claim 5, wherein the element of the III group elements includes at least one of the following elements: boron (B), aluminum (Al), gallium (Ga), indium (In), and the element of the V group elements includes at least one of the following elements: nitrogen (N), phosphor (P), arsenic (As), antimony (Sb).

7. The treatment method for diamonds according to claims 1, 2, 3 or 4, wherein the particles bombarded are ions.

8. The treatment method for diamonds according to claims 1, 2, 3 or 4, wherein the power density of the light in the ultra-violet spectrum is at least 0.1 $W/cm^2$.

9. The treatment method for diamonds according to claims 1, 2, 3 or 4, wherein the light in the ultra-violet spectrum is excimer laser light.

10. The treatment method for diamonds according to claims 2, or 4, wherein the range of the heating temperature is from 300 to 700° C.

11. The treatment method for diamonds according to claims 2, or 4, wherein the ambient containing oxygen is air.

12. A treatment method for diamonds comprising irradiating light in the ultra-violet spectrum on a diamond or a diamond thin film formed on a specified substrate in vacuum, at atmospheric pressure of $1 \times 10^{-5}$ Torr or less, and having said ultraviolet light absorbed on the surface and inside of said diamond or diamond thin film, wherein the diamonds are manufactured prior to the treatment method.

13. A treatment method for diamonds according to claim 12 which is intended to remove lattice defects and non-diamond components contained in diamonds.

14. A treatment method for diamonds according to claim 12, wherein the diamonds are completely manufactured prior to the treatment method.

15. A treatment method for diamonds according to claim 12, which is conducted at an atmospheric pressure of $1 \times 10^{-6}$ Torr.

16. A treatment method for diamonds according to claim 12, which is conducted at atmospheric pressure of $1 \times 10^{-6}$ Torr or below.

17. A treatment method for removing defects and non-diamond components from diamonds comprising irradiating light in the ultra-violet spectrum on a diamond or a diamond thin film formed on a specified substrate in an ambient containing at least oxygen, and having said ultraviolet light absorbed on the surface and inside of said diamond or diamond thin film in regions where defects and non-diamond components exist and removing selectively the defects and non-diamond components.

18. The treatment method of the claim 17, wherein said diamond is manufactured prior to the treatment method.

* * * * *